United States Patent
Hoffmann (10) Patent No.: US 8,565,947 B2
(45) Date of Patent: Oct. 22, 2013

(54) METHOD FOR REGULATING THE CHARGING STATE OF AN ENERGY ACCUMULATOR FOR A VEHICLE COMPRISING A HYBRID DRIVE

(75) Inventor: Rolf Hoffmann, Steinheim (DE)

(73) Assignee: Voith Patent GmbH, Heidenheim (DE)

( * ) Notice: Subject to any disclaimer, the term of this patent is extended or adjusted under 35 U.S.C. 154(b) by 765 days.

(21) Appl. No.: 12/451,160

(22) PCT Filed: Apr. 22, 2008

(86) PCT No.: PCT/EP2008/003204
§ 371 (c)(1),
(2), (4) Date: Mar. 19, 2010

(87) PCT Pub. No.: WO2008/131885
PCT Pub. Date: Nov. 6, 2008

(65) Prior Publication Data
US 2010/0217465 A1    Aug. 26, 2010

(30) Foreign Application Priority Data
Apr. 28, 2007    (DE) .......................... 10 2007 020 196

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60K 6/20* | (2007.10) |
| *H02J 7/14* | (2006.01) |
| *H02J 7/00* | (2006.01) |

(52) U.S. Cl.
USPC .......... 701/22; 180/65.21; 320/104; 320/132; 320/134; 320/135; 903/903

(58) Field of Classification Search
USPC ...................... 701/1, 22, 424; 180/65.1–65.8; 320/127–136, 166, 104; 903/903
See application file for complete search history.

(56) References Cited

U.S. PATENT DOCUMENTS

| | | | | |
|---|---|---|---|---|
| 4,140,352 | A | * | 2/1979 | Delpech et al. ............... 303/126 |
| 5,469,816 | A | * | 11/1995 | Murakawa et al. ............... 123/2 |

(Continued)

FOREIGN PATENT DOCUMENTS

| | | | |
|---|---|---|---|
| DE | 44 30 670 | 3/1995 | .............. B60K 41/28 |
| DE | 103 46 213 | 4/2005 | .............. B60L 11/12 |

(Continued)

OTHER PUBLICATIONS

"The supercap communication challenge", Batteries & Energy Storage Technology, Winter 2005, p. 107-113.*

(Continued)

*Primary Examiner* — Khoi Tran
*Assistant Examiner* — Abby Lin
(74) *Attorney, Agent, or Firm* — Ohlandt, Greeley, Ruggiero & Perle, LLP (57) ABSTRACT

A method for regulating a charging state of an energy accumulator for a vehicle with a hybrid drive includes detecting a driving speed variable value of the vehicle and determining a nominal charging state of the energy accumulator as a function of the driving speed variable value by a control unit, detecting an actual charging state of the energy accumulator, comparing the actual charging state with the nominal charging state by the control unit, switching on an energy consumer by a charging state regulator, for at least partially discharging the energy accumulator when the actual charging state exceeds the nominal charging state, tabulating a first nominal charging state value as a function of the driving speed variable value by a characteristic curve, in order to determine the nominal charging state of the energy accumulator, and adapting the characteristic curve by the control unit when the vehicle is braked.

12 Claims, 2 Drawing Sheets

(56) References Cited

U.S. PATENT DOCUMENTS

| | | | | |
|---|---|---|---|---|
| 5,965,991 | A * | 10/1999 | Koike et al. | 318/139 |
| 6,242,873 | B1 * | 6/2001 | Drozdz et al. | 318/139 |
| 6,269,290 | B1 | 7/2001 | Egami et al. | 701/22 |
| 6,362,602 | B1 * | 3/2002 | Kozarekar | 320/160 |
| 6,477,035 | B1 * | 11/2002 | Cepas et al. | 361/306.3 |
| 6,608,482 | B2 * | 8/2003 | Sakai et al. | 324/426 |
| 6,809,429 | B1 * | 10/2004 | Frank | 290/40 C |
| 7,173,396 | B2 * | 2/2007 | Gunji | 320/132 |
| 8,076,883 | B2 * | 12/2011 | Wallner | 318/400.3 |
| 2001/0024104 | A1 * | 9/2001 | Suzuki | 320/104 |
| 2003/0036001 | A1 * | 2/2003 | James et al. | 429/232 |
| 2004/0021448 | A1 * | 2/2004 | Bluemel et al. | 322/44 |
| 2004/0032264 | A1 * | 2/2004 | Schoch | 324/426 |
| 2004/0207350 | A1 * | 10/2004 | Wilton et al. | 318/376 |
| 2005/0228553 | A1 * | 10/2005 | Tryon | 701/22 |
| 2005/0263333 | A1 * | 12/2005 | Fujiki | 180/65.2 |
| 2006/0048516 | A1 * | 3/2006 | Tenbrock et al. | 60/698 |
| 2006/0048988 | A1 * | 3/2006 | Dreibholz et al. | 180/213 |
| 2007/0167281 | A1 * | 7/2007 | Liebl et al. | 477/3 |
| 2007/0170896 | A1 * | 7/2007 | Proebstle et al. | 322/37 |
| 2007/0295543 | A1 * | 12/2007 | Fassnacht | 180/65.3 |
| 2008/0021628 | A1 * | 1/2008 | Tryon | 701/99 |
| 2009/0134843 | A1 * | 5/2009 | Mizuno et al. | 320/134 |

FOREIGN PATENT DOCUMENTS

| | | | |
|---|---|---|---|
| EP | 1 136 311 | 9/2001 | B60L 11/12 |
| EP | 1 676 738 | 7/2006 | B60K 6/04 |
| WO | WO 2007/028755 | 3/2007 | B60K 6/04 |

OTHER PUBLICATIONS

The supercap communication challenge, Batteries & Energy Storage Technology, Winter 2005, p. 107-113.*

International Search Report dated Nov. 26, 2008 from corresponding PCT Application No. PCT/EP2008/003204.

Written Opinion dated Nov. 26, 2008 from corresponding PCT Application No. PCT/EP2008/003204.

* cited by examiner

METHOD FOR REGULATING THE CHARGING STATE OF AN ENERGY ACCUMULATOR FOR A VEHICLE COMPRISING A HYBRID DRIVE

BACKGROUND OF THE INVENTION

1. Field of the Disclosure

The invention relates to a method for regulating the charging state (charging state regulating method) of an energy accumulator for a vehicle with hybrid drive as well as a control unit for carrying out the method. In this way, a driving speed variable value of the vehicle is detected by means of a driving speed detection device and a nominal charging state of the energy accumulator is determined by the control unit as a function of the driving speed variable value. After detecting an actual charging state of the energy accumulator by means of the charging state detection means, the control unit compares the actual charging state with the nominal charging state.

2. Description of Related Art

Such methods are known, for example, from DE 10346213 A1 and DE 44 30 670 A1. Vehicles with hybrid drive have an internal combustion engine and an electric motor. During startup and acceleration or revving up the internal combustion engine, a torque is applied to it by means of the electric motor. This can be carried out, for example, via a coupling of the electric motor to the drive train of the vehicle. When the vehicle is braked, the electric motor is used as a generator, by means of which the kinetic energy of the vehicle (braking energy) is transformed into electrical energy and is stored again in the energy accumulator. In this way, the energy consumption of the motor vehicle can be considerably reduced when compared with a motor vehicle having only an internal combustion engine.

In order to regulate the charging state of the energy accumulator, a function or characteristic curve is defined as a function of driving speed variable values, i.e., of values that are proportional to the driving speed or the driving speed itself, which indicates a lower limit of the charging state of the energy accumulator. If the real-time charging state of the energy accumulator, thus the actual charging state, lies below a nominal charging state determined for a real-time driving speed variable value by means of the function or characteristic curve, then the energy accumulator will be charged up by means of the electric motor used as a generator. Otherwise, a charging up of the energy accumulator is not conducted by the internal combustion engine. The characteristic curve or the function is designed in such a way that continuously lower charging states of the energy accumulator are permitted with increasing real-time driving speed without calling upon the internal combustion engine for charging up the accumulator. This is based on the fact that with increasing driving speed, the probability increases that the energy accumulator will be charged up in a timely manner by a braking and an overcharging of the energy accumulator shall be prevented.

The known methods proceed implicitly from a relatively large accumulator, whose charging state is increased by the braking energy only within a certain range. In addition, they proceed from the fact that a certain charging state of the accumulator must at least be maintained, which is why the internal combustion engine will also be called upon as needed for charging up the accumulator. These methods are thus well suitable for batteries and storage batteries as accumulators. Batteries, however, have a relatively poor efficiency with respect to "charging up the necessary energy" while "discharging reusable energy", since they have a relatively high internal resistance, which is caused by the chemical reactions in the battery during charging and discharging.

Further, batteries and storage batteries wear out even after a few thousand charging cycles, whereby their efficiency is further adversely affected. It is also known to use capacitors for storing electrical energy. Capacitors have a far better efficiency than batteries or storage batteries and wear out much less rapidly. For example, the efficiency of capacitors is reduced only after the number of charging cycles is in the range of millions. Capacitors, however, are relatively small energy accumulators, that is, their charging capacity is not much greater than the braking energy that occurs when the vehicle is braked from its highest speed to a complete stop. Capacitors thus have only a small charging capacity, i.e., a small maximum energy storage capacity when compared with batteries or storage batteries, so that the known charging state regulating methods are only poorly suitable for regulating the charging state of a capacitor.

Document WO 2007/028755 A1 discloses a device for supplying energy as well as a method for controlling the flow of energy in a hybrid vehicle, which provides two energy accumulators, wherein a charging regulator is present, which adjusts the nominal charging state of one of the energy accumulators in such a way that the nominal charging state of this one energy accumulator is decreased with increasing speed of the hybrid vehicle.

BRIEF SUMMARY OF THE DISCLOSURE

Document EP 1 136 311 A2 also describes an energy charging device as well as a method for charging an energy accumulator unit for a hybrid vehicle.

BRIEF SUMMARY OF THE DISCLOSURE

The object of the invention is to provide a method for regulating the charging state of an energy accumulator for a vehicle with hybrid drive as well as a control unit for carrying out the method, which avoid the disadvantages of the prior art, and in particular, the method for regulating the charging state of energy accumulators with a relatively small maximum energy storage capacity will be suitable.

This object will be accomplished by the method and the control unit according to the independent claims. The dependent claims represent preferred embodiments of the invention.

A method according to the invention for regulating the charging state of an energy accumulator for a vehicle with hybrid drive has the following method steps:

Detecting a driving speed variable value of the vehicle by means of a driving speed detection device and determining a nominal charging state of the energy accumulator as a function of the driving speed variable value by the control unit;

Detecting an actual charging state of the energy accumulator by means of the charging state detection means; and Comparing the actual charging state with the nominal charging state by means of the control unit;

An energy consumer is switched on by means of a charging state regulator for at least partially discharging the energy accumulator when the actual charging state exceeds the nominal charging state;

Determining the nominal charging state from a characteristic curve which tabulates the nominal charging state values as a function of driving speed variable values or links these by means of a function, in order to determine the nominal charging state of the energy accumulator;

The characteristic curve is adapted by means of the control unit when the vehicle is braked, whereby a correction value determined by the control unit is added to the nominal charging state value of the characteristic curve, this correction value being associated with the real-time driving speed variable value during braking, and the nominal charging state which is increased or decreased by adding the correction value is stored as the new nominal charging state value of the characteristic curve for the real-time driving speed variable value.

According to the invention, an energy consumer is switched on by means of a charging state regulator for at least partially discharging the energy accumulator when the actual charging state exceeds the nominal charging state.

In order to be able to use a small energy accumulator, the principal task of the charging state regulating method according to the invention is thus not to assure a specific minimum charging state of the accumulator. Instead, the charging state regulating method according to the invention assures that the nominal charging state of the accumulator is always guided back to the nominal charging state. The state when the actual charging state exceeds the nominal charging state may occur, if the energy accumulator has just been charged up by a braking and/or after an acceleration of the vehicle, if the real-time nominal charging state has been reduced for the vehicle speed which has been increased by the acceleration. Due to its being guided back to the nominal charging state when the nominal charging state of the energy accumulator is correspondingly determined as a function of the driving speed variable value, the actual charging state is always so low that braking energy that occurs can always be largely taken up by the energy accumulator.

The nominal charging state that is dependent on the driving speed variable value can be further selected in such a way that, for example, as much energy as possible is retained in the energy accumulator when the vehicle has stopped, in order to optionally switch off the internal combustion engine of the hybrid drive and to be able to supply the auxiliary services of the hybrid drive, that is, its electric motor, from the energy accumulator.

Due to the limits of the actual charging state undertaken in this way, the method according to the invention is suitable for use in vehicles with hybrid drive having relatively small energy accumulators. A sufficient discharging of the accumulator is always brought about in order to take up braking energy that may occur. This is combined with a charging state of the accumulator that is always as high as possible.

This balance makes it possible to operate electrically operated auxiliary services as long as possible from the energy accumulator and thus from the recovered braking energy, so that as little fuel as possible needs to be used for the operation of these auxiliary services. These properties make the method according to the invention suitable for regulating the charging state of the energy accumulator in vehicles with, for example, double-layer capacitors as the energy accumulator. Such vehicles have only a relatively small maximum energy accumulator capacity in the energy accumulator, measured against the vehicle mass, due to the physical properties of double-layer capacitors. Further, the method is also particularly suitable for regulating the charging state of the energy accumulator in commercial vehicles with hybrid drive, since these also have small energy accumulators, referred to their vehicle mass, in order not to reduce the possible load.

The electric motor of the hybrid drive is preferably switched on as an energy consumer. For this purpose, it is determined by the control unit, i.e., for example, by the charging state regulator as part of the control unit, whether the driver of the vehicle requires power for the hybrid drive, that is, whether the driver steps on the gas. If this is the case and the actual charging state exceeds the nominal charging state for the real-time vehicle speed, the electric motor of the hybrid drive is switched on, at least until the actual charging state is at or has dropped below the nominal charging state to be determined by the control unit for the real-time vehicle speed, that is, the electric motor is operated to support or to replace the internal combustion engine of the hybrid drive. In this way, braking energy that occurs is extensively re-used for driving the vehicle, that is, apart from losses due to the physically limited efficiency of the energy accumulator and the control unit as well as of the hybrid drive itself.

For determining the nominal charging state of the energy accumulator, a characteristic curve which tabulates the nominal charging state values as a function of driving speed variable values or links these by means of a function determines the nominal charging state. Such a characteristic curve can be determined in a very simple way and can be modified as needed.

In this way, the characteristic curve is particularly advantageously designed in such a way that braking energy that is dependent on the driving speed variable values at any vehicle speed can be taken up by the energy accumulator, so that it is always assured that as little energy as possible is lost during braking, which leads to an optimization of the fuel consumption of the vehicle.

In a particularly preferred embodiment variant of the method according to the invention, the characteristic curve is adapted by at least one of the adaptation methods described below by means of the control unit when the vehicle is braked. In this way, a nominal charging state value of the characteristic curve which is associated with the real-time driving speed variable value during braking is added to a correction value determined by the control unit, and the nominal charging state which is increased or decreased by adding the correction value is stored as a new nominal charging state value of the characteristic curve for the real-time driving speed variable value. In this way, for example, the characteristic curve can be adapted automatically by the control unit to the particular driving style of a driver. In this way, the control unit automatically learns an optimal management of the energy of the energy accumulator.

For example, if vehicles, such as, e.g., city buses in city traffic, repeatedly traverse the same route, a characteristic curve adapted to the route can optimize the fuel consumption of the vehicle. Therefore, the characteristic curve of the nominal charging state can be adapted automatically, so that the route topography is reflected therein.

The characteristic curve, with which a nominal charging state value is assigned to each driving speed variable value, can be compiled, for example, from a plurality of segments, in particular straight lines, whereby in order to correct the characteristic curve or the nominal charging state values, the individual segments are shifted to a larger nominal charging state value or to a smaller nominal charging state value, and they are particularly shifted in parallel. For example, the beginning and the end of the individual segment or of the individual straight lines are formed as a pair of values, comprised of the corresponding nominal charging state value and the vehicle speed. By adding the correction value, the nominal charging state value of the two value pairs is increased or decreased, while the respective driving speed variable value is retained. Advantageously, since a value pair for the end of such a straight line or such a segment is simultaneously the value pair at the beginning of the next (adjacent) straight line or segment, the shifting of an individual straight line or of an individual segment also has an effect on the two adjacent segments or straight lines. These two adjacent segments or straight lines are provided with a changed slope by shifting the segment that is enclosed between them or the straight line that is enclosed between them, since only one of their end points will be shifted.

The following method steps are preferably carried out in order to determine the correction value for adapting the characteristic curve:

Determining a difference value for the nominal charging state from the nominal charging state value for the real-time driving speed variable value at the beginning of the braking and an end nominal charging state value for the end driving speed variable value at the end of the braking;

Determining a difference value for the actual charging state from an actual charging state value at the beginning of braking and an actual charging state value of the energy accumulator at the end of braking;

Comparing the difference value for the nominal charging state with the difference value for the actual charging state;

Establishing the correction value for lowering the characteristic curve in such a way that the new nominal charging state value is smaller than the old nominal charging state value if the difference value for the actual charging state is larger than the difference value for the nominal charging state or Establishing the correction value for raising the characteristic curve such that the new nominal charging state value is larger than the old nominal charging state value, if the difference value for the actual charging state is smaller than the difference value for the nominal charging state.

In this way, the characteristic curve is automatically adapted by the control unit so that, if the actual recovery of braking energy, which is calculated by the difference value for the actual charging state, is larger than the recovery of braking energy provided in the characteristic curve, which is computed by the difference value for the nominal charging state, the entire braking energy can be stored in the energy accumulator for a subsequent braking under the same braking conditions, i.e., the same beginning and end speeds. Consequently, the characteristic curve, i.e., the nominal charging state value, is lowered for the driving speed at the beginning of braking. In contrast, if the difference in the actual charging states is smaller than that of the nominal charging states, then the actual recovery of braking energy is smaller than that given in the characteristic curve. Consequently, the characteristic curve, i.e., the nominal charging state value, is raised for the driving speed at the beginning of braking, whereby the energy that is present in the energy accumulator, which is available, for example, for a start-up, is maximized, without losing braking energy occurring under the same braking conditions due to an energy accumulator that is already too greatly charged up.

By establishing the correction value for lowering the characteristic curve, nominal charging state values of the characteristic curve that are associated with larger driving speed variable values than the real-time driving speed variable value are advantageously reduced to the new nominal charging state value, if the nominal charging state values associated with the larger driving speed variable values are larger than the new nominal charging state value; and by establishing the correction value for raising the characteristic curve, nominal charging state values of the characteristic curve that are associated with smaller driving speed variable values than the real-time driving speed variable value are advantageously increased to the new nominal charging state value, if the nominal charging state values associated with the smaller driving speed variable values are smaller than the new nominal charging state value.

Thus, with a lowering of the characteristic curve for a driving speed, it is also examined whether the characteristic curve at higher driving speeds still has any larger nominal charging state values than the new, decreased nominal charging state value. If the answer is yes, all nominal charging state values of the characteristic curve, which have a larger nominal charging state value with higher driving speeds than the new, decreased nominal charging state value, are reduced to the new, decreased nominal charging state value. In contrast, with an increase in the characteristic curve for a driving speed, it is also examined whether regions of the characteristic curve at lower driving speeds have smaller nominal charging state values than the new, increased nominal charging state value. If the answer is yes, these nominal charging state values of the characteristic curve are increased to the increased nominal charging state value.

For a lowering [of the curve], the entire characteristic curve or the above-described characteristic curve segments for higher driving speeds is/are not simply decreased, and for an increase, the entire characteristic curve for lower driving speeds is not simply raised, since if it were, the entire characteristic curve or the characteristic curve segments would become increasingly steeper and finally would degenerate to a step function after several brakings, i.e., after performing several adaptations. Rather, only those individual values or beginning points and/or end points (value pairs) of the individual segments are either raised or lowered, which are correspondingly smaller or larger than the new nominal charging state value, whereas equally large, or with an increase, already larger, or with a decrease, already smaller nominal charging state values of the characteristic curve will be retained.

In adapting the characteristic curve, it is therefore considered that less braking energy is never expected when braking from a higher driving speed, than when braking from a lower driving speed. It can be concluded from this that the maximum charging state characteristic curve plotted against the driving speed can never increase to higher driving speeds, and vice versa, can never decrease to lower driving speeds. The control unit will thus learn the optimal energy management of the energy accumulator in an accelerated manner, so that even after a few brakings, a characteristic curve that is adapted to the conditions of vehicle operation is provided.

If the absolute value of the correction value is determined by multiplying the difference between the difference value for the nominal charging state and the difference value for the actual charging state by a learning factor, by selecting the learning factor, it can be determined how rapidly, that is, after how many brakings, a previously established characteristic curve is completely adapted to the vehicle operating conditions. Therefore, the learning factor is preferably smaller than one, selected so as to provide a sub-relaxation process, so that the risk that a braking will lead to an adverse effect on the characteristic curve under particularly extraordinary circumstances is reduced.

In the case of establishing the correction value for lowering the characteristic curve, the learning factor is distinguished preferably in its amount from the learning factor in the case of establishing the correction value for raising the characteristic curve. For this purpose, the learning factor, for example, may be made dependent on the sign of the difference between the difference value for the nominal charging state and the difference value for the actual charging state. In this way, the learning factor in the case of lowering the characteristic curve is preferably larger than in the case of raising the characteristic curve.

In this way it can be achieved that the characteristic curve of the nominal charging state will be lowered very rapidly, if more energy than that which corresponds to the characteristic curve can be recovered in the case of a braking;
on the other hand, the characteristic curve will be increased again only very slowly if less energy is recovered than that which corresponds to the characteristic curve. This permits the characteristic curve to be aligned as desired either more to mean values, minimum values, or even maximum values of the recovered braking energy, and thus the requirement for having storage of recovered energy that is always as complete as possible in the energy accumulator, and the requirement of having an energy content in the energy accumulator that is as high as possible, for example, for use in starting up the vehicle are weighed against one another in adapting the characteristic curve.

A control unit according to the invention for regulating the charging state of an energy accumulator for a vehicle with hybrid drive is equipped in such a way as to carry out and/or control the method according to the invention. The control unit is equipped for determining a nominal charging state of the energy accumulator as a function of a driving speed variable value of the vehicle that can be detected by a driving speed detection device and for comparing an actual charging state of the energy accumulator that can be detected by charging state detection means with the nominal charging state. According to the invention, the control unit has a charging state regulator, wherein the charging state regulator is equipped for switching on an energy consumer for at least partially discharging the energy accumulator when the actual charging state exceeds the nominal charging state. Due to the partial discharging, the actual charging state is brought back, in particular, at least to the nominal charging state. The switching on of the energy consumer can thus be terminated again through the actual charging state by the charging state regulator when the nominal charging state has been reached.

The method according to the invention can be carried out by means of the control unit according to the invention. Thus, the advantages of the method according to the invention are provided by the control unit.

The charging state regulator is preferably equipped for this purpose of switching on an electric motor of the hybrid drive as an energy consumer, so that the energy removed from the energy accumulator in the partial discharging is used for driving the vehicle. For this purpose, the partial discharging and thus the switching on of the electric motor is carried out only when the vehicle driver requires power for the hybrid drive.

The control unit comprises a memory, in which is filed a characteristic curve that tabulates the nominal charging state values as a function of driving speed variable values. In this way, the control unit is equipped for determining the nominal charging state of the energy accumulator by determining the nominal charging state from the characteristic curve. The characteristic curve is advantageously plotted in such a way that braking energy that is dependent on the driving speed variable values at any vehicle speed can be taken up by the energy accumulator, in order for the energy accumulator to be able to take up the braking energy that is released in each braking.

The control unit is equipped to carry out an adaptation of the characteristic curve according to one of the described adaptation methods when the vehicle is braked, in order to adapt the energy management of the energy accumulator by means of the control unit to repeatedly occurring vehicle operating conditions.

A vehicle according to the invention has a hybrid drive as well as an energy accumulator, a driving speed detection device, equipped in order to detect a driving speed variable value of the vehicle, and charging state detection means, equipped to detect an actual charging state of the energy accumulator. Further, a control unit according to the invention is provided in the vehicle.

The vehicle according to the invention can have an energy accumulator with a maximum capacity in the range of the maximum braking energy of the vehicle at a maximum vehicle speed as the energy accumulator. The energy accumulator may thus have a very small maximum capacity when compared with energy accumulators conventionally used in hybrid-drive vehicles. Such small energy accumulators, for example, reduce the weight of the vehicle. For example, a capacitor, which wears out much less rapidly than an energy accumulator conventionally used in hybrid-drive vehicles, can be used as the energy accumulator.

The energy accumulator is designed particularly advantageously as a multi-layer capacitor, preferably as a double-layer capacitor. Such capacitors are characterized by a high maximum capacity of the energy accumulator for the capacitor weight.

BRIEF DESCRIPTION OF THE SEVERAL VIEWS OF THE DRAWINGS

The invention will be explained by way of example below on the basis of an embodiment example and the appended figures.

Here.

DETAILED DESCRIPTION OF THE DISCLOSURE

The figures of the drawing show the subject according to the invention in a very schematized manner and are to be understood as not shown to scale. The individual components of the subject according to the invention are shown in such a way that their structure or their function can be well represented.

Figure 1:
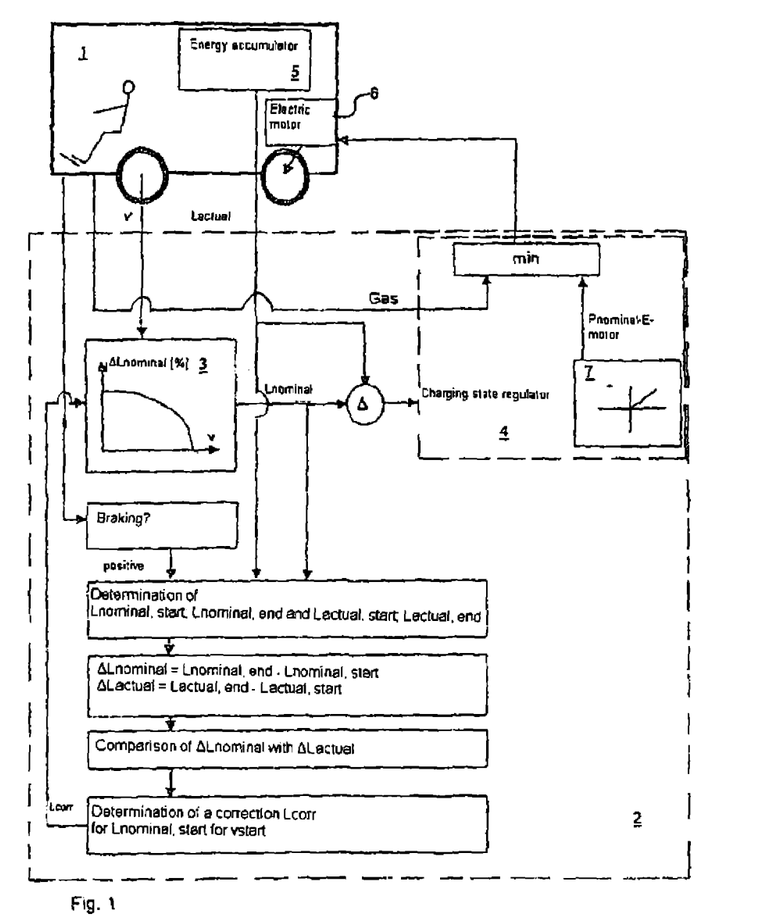
FIG. 1 shows a vehicle having a control unit according to the invention, equipped for carrying out a preferred embodiment of the method according to the invention.

In FIG. 1, a vehicle 1 according to the invention is shown schematically. A control unit 2 according to the invention is shown for vehicle 1, which is actually shown outside vehicle 1 only in order to increase the clarity of the figure. Control unit 2 is equipped for carrying out a preferred embodiment of the method according to the invention. The arrows joining the vehicle and/or control unit components that are shown symbolize the flow of information when performing the method according to the invention.

Vehicle 1 has an energy accumulator 5 and a hybrid drive with an electric motor 6. In order to assure that, on the one hand, as much energy as possible is present at any time in energy accumulator 5, and, on the other hand, however, braking energy that occurs can be taken up with maximum probability, a function for a nominal charging state, $L_{nominal}$, which is dependent on vehicle speed and which is provided, for example, as a characteristic curve, is stored in an information memory 3 of control unit 2. Unlike the known methods for regulating the charging state of energy accumulator 5 for vehicle 1 with hybrid drive, this function does not represent a minimum charging state function, but rather a maximum charging state function. The characteristic curve represents a nominal charging state $L_{nominal}$ as a percentage of a maximum capacity for energy accumulator 5 over driving speed v or from driving speed variable values.

In the method according to the invention, in the case of the instantaneous driving speed v, which is provided as the driving speed variable value by a driving speed detection device, an instantaneous nominal charging state $L_{nominal}$ is determined from the characteristic curve dependent on the driving speed v, which indicates how much the energy accumulator 5 must be discharged for this driving speed v, so that it can take up the energy of a braking from this driving speed v until vehicle 1 comes to a stop. An actual charging state $L_{actual}$ of energy accumulator 5, thus the instantaneous actual charging state of energy accumulator 5, is detected by charging state detection means, which can be disposed, for example, directly in energy accumulator 5 or in control unit 2, and can provide for a comparison with the nominal charging state $L_{nominal}$ which is performed by control unit 2.

For this purpose, for example, a difference $\Delta$ is found between the actual charging state $L_{actual}$ and the nominal charging state $L_{nominal}$. If the actual charging state $L_{actual}$ of energy accumulator 5 lies above this nominal charging state $L_{nominal}$, a charging state regulator 4 then provides that, as soon as the driver requires power from the internal combustion engine, i.e., as soon as he steps on the gas, the electrical engine, thus electric motor 6 of the hybrid drive, is switched on, i.e., energy accumulator 5 is discharged and replaces a correspondingly large fraction of the power of the internal combustion engine, so that the actual charging state of energy accumulator 5 is returned to the nominal charging state $L_{nominal}$.

Charging state regulator 4 thus regulates the power to be supplied by electric motor 6, for example, as a function of the difference $\Delta$ and of the magnitude of the driver's power requirement. For example, a nominal power $P_{nominal-E-motor}$ is determined via an electric motor power function 7, for example, via the difference $\Delta$ which is tabulated, i.e., stored in a memory of regulator 4. The minimum of $P_{nominal-E-motor}$ and the required power is then demanded from electric motor 6 as power to be introduced from electric motor 6 by means of charging state regulator 4.

If the actual charging state of energy accumulator 5 lies below the nominal charging state $L_{nominal}$ determined from the characteristic curve, then the charging state regulator 4 has no effect on the charging state of energy accumulator 5, since the energy accumulator 5 in all probability can take up the energy occurring with the next braking.

Alternatively or additionally, other methods can be performed for reducing the actual charging state $L_{actual}$ of energy accumulator 5. For example, designs for the electrical operation of secondary loads or ancillary consumers or, however, methods in order to increase the efficiency of an internal combustion engine can be drawn on by shifting the load point.

The schematically shown control unit 2 is equipped to adapt the characteristic curve tabulating the nominal charging state $L_{nominal}$ as a function of the driving speed v. Control unit 2 thus continually tracks the characteristic curve based on the actually occurring braking energies that are determined. In this way, first there is a continual monitoring of whether a braking has begun. If the answer is yes, i.e., with a positive monitoring result, the nominal charging state $L_{nominal, start}$ determined from the characteristic curve at the time point of the beginning of braking and the actual charging state $L_{actual, start}$ of energy accumulator 5 are determined and these values are stored.

If the braking has terminated, the nominal charging state $L_{nominal, end}$ determined from the characteristic curve and the actual charging state $L_{actual, end}$ of energy accumulator 5 at the time point when braking ends are determined. Then, from these four values, on the one hand, a difference value for the nominal charging state $\Delta L_{nominal}$ is calculated as the difference between the two nominal charging states from the end of braking, $L_{nominal, end}$ and the beginning of braking, $L_{nominal, start}$, and on the other hand, a difference value for the actual charging state $\Delta L_{actual}$ is calculated as the difference between the actual charging states from the end of braking, $L_{actual, end}$ and the beginning of braking, $L_{actual, start}$. Then these two differences are compared.

If the difference value for the actual charging state $\Delta L_{actual}$ is larger than the difference value for the nominal charging state $\Delta L_{nominal}$, then the actual recovery of braking energy is greater than what is given in the characteristic curve. Consequently, the characteristic curve is lowered for the speed at the beginning of braking. In contrast, if the difference in the actual charging states is smaller than that of the nominal charging state, then the actual recovery of braking energy is smaller than that given in the characteristic curve. Consequently, the characteristic curve is raised for the speed at the beginning of braking. The characteristic curve is corrected by establishing a correction value $L_{corr}$ for the value of $L_{nominal}$ at the driving speed $v_{start}$ and by adding this correction value $L_{corr}$ to $L_{nominal}$ and storing the result as the new value $L_{nominal}$ in the characteristic curve. The change, that is, the adaptation by raising or lowering the characteristic curve, can be carried out, for example, in such a way that a difference between the difference value for the nominal charging state $\Delta L_{nominal}$ and the difference value for the actual charging state $\Delta L_{actual}$ is multiplied by a factor k, i.e., a learning factor, in order to determine a correction value for the value of $L_{nominal}$ at the speed $v_{start}$ of the characteristic curve. The learning factor is here preferably selected smaller than 1 in order to realize a so-called sub-relaxation method.

For this purpose, the following algorithm is performed, in particular:

If $\Delta L_{actual} > L_{nominal}$, i.e., if too much braking energy is present, that is, the free capacity of the energy accumulator would be insufficient for taking up the braking energy, the value $L_{corr}=k_1(\Delta L_{nominal}-\Delta L_{actual})$ will be selected. If $\Delta L_{actual} < L_{nominal}$, i.e., if too little braking energy is present, then $L_{corr}=k_2(\Delta L_{nominal}-\Delta L_{actual})$ will be selected. Therefore, the algorithm applies in the case of a sub-relaxation method for learning factors $k_1$ and/or $k_2 < 1$. It may be meaningful to select $k_2 \ll k_1$.

Figure 2A:
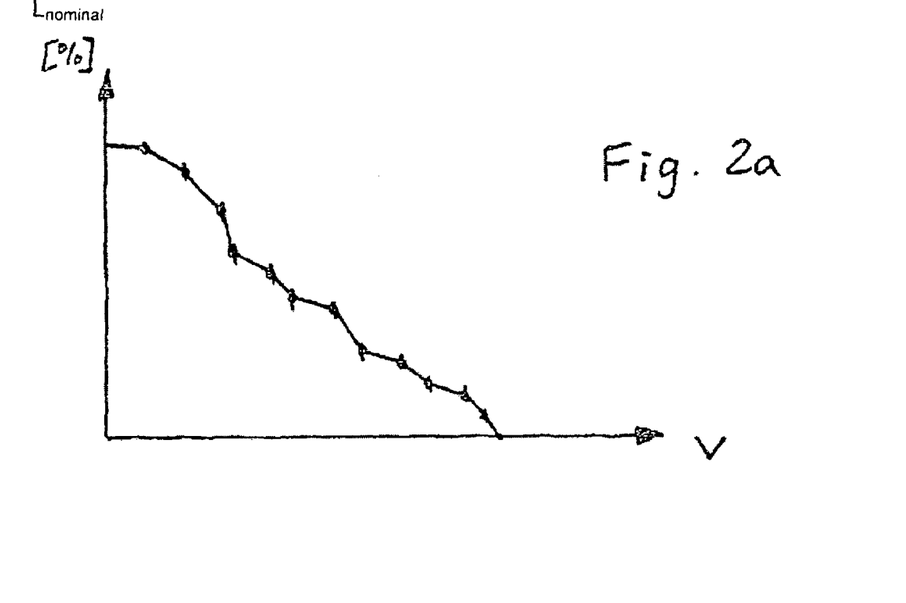
FIG. 2 shows one possibility for a configuration of a characteristic curve that is composed of individual segments or straight lines.

A possible form of a characteristic curve is shown in FIG. 2. As can be seen, the characteristic curve, which describes the nominal charging state plotted against the driving speed, is comprised of a plurality of straight lines connected to one another. The course of each line is determined by two value pairs, namely a first pair of values for driving speed v and of nominal charging state $L_{nominal}$ at the beginning of the line and a second pair of values for driving speed v and nominal charging state $L_{nominal}$ at the end of the line. The pair of values at the end of a straight line is equal to the pair of values at the beginning of the next line, considered in the course of the characteristic curve from left to right, i.e., from lower driving speeds to higher driving speeds. This is particularly clear from FIG. 2a.

Figure 2B:
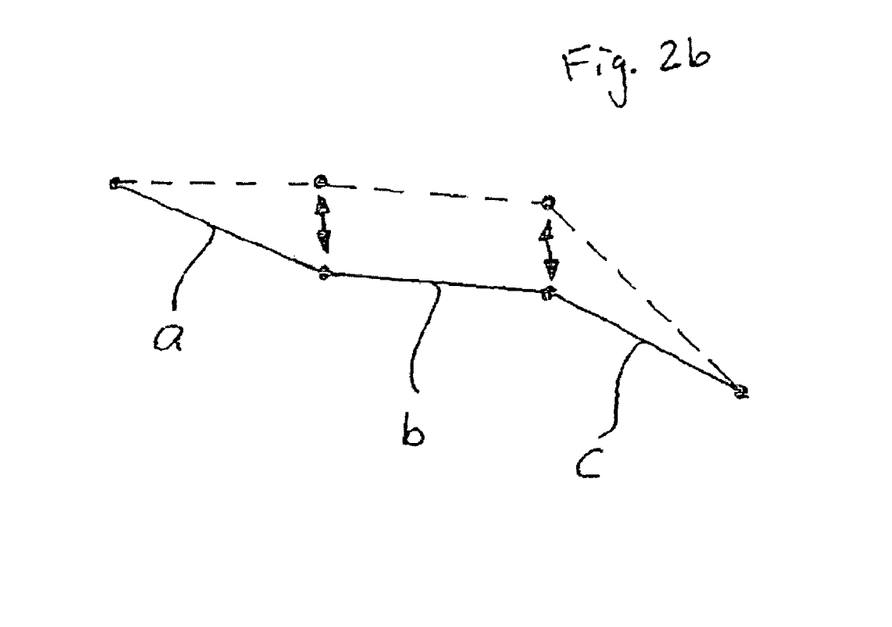

FIG. 2b shows an excerpt from the characteristic curve of FIG. 2a with three segments a, b, c. Now, if segment b is shifted in parallel due to adaptation at a specific speed, the slope of the segment or of straight line b in fact remains constant, but the slopes of the adjacent segments or straight lines a and c change. If straight line b is shifted upward, then in the characteristic curve which is shown for higher driving speeds and is overall decreasing, the slope of straight line a is smaller, while in contrast, the slope of straight line c is greater. In this manner, the straight line according to the described adaptation is then always shifted in parallel, if, in the case of a driving speed value v, which lies on straight line b, the nominal charging state value $L_{nominal}$ has been evaluated as too small or too large according to the described method.

In the described correction of all characteristic values for the nominal charging state at higher driving speeds, insofar as the straight line has been shifted down, or at lower driving speeds, insofar as the straight line has been shifted up, the individual straight lines do not shift in parallel, but their slopes change in these "tracked" regions of the characteristic curve, since only one of the two value pairs at their ends is corrected to the new nominal charging state value or the correction breaks down very differently. There is one exception here, namely when the corresponding segment or the corresponding straight line has previously been horizontal and thus both pairs of values are corrected to the same extent.

The invention is not limited to the embodiment examples indicated above. Rather, a number of variants are conceivable, which also make use of the features of the invention in basically different types of embodiments.

The invention claimed is:

1. A method for regulating a charging state of an energy accumulator for a vehicle with a hybrid drive comprising:
   detecting a driving speed variable value of the vehicle by a driving speed detection device and determining a nominal charging state of the energy accumulator as a function of the driving speed variable value by a control unit;
   detecting an actual charging state of the energy accumulator by a charging state detection device;
   comparing the actual charging state with the nominal charging state by said control unit;
   switching on an energy consumer by a charging state regulator, for at least partially discharging the energy accumulator when the actual charging state exceeds the nominal charging state;
   tabulating a first nominal charging state value as a function of the driving speed variable value by a characteristic curve, in order to determine the nominal charging state of the energy accumulator; and
   adapting the characteristic curve by said control unit when the vehicle is braked, whereby a correction value determined by said control unit is added to the first nominal charging state value of the characteristic curve, said first nominal charging state value being associated with a real-time driving speed variable value during braking, and the first nominal charging state value which is increased or decreased by adding the correction value is stored as a new nominal charging state value of the characteristic curve for the real-time driving speed variable value,
   wherein the correction value is determined by:
      determining a difference value for the nominal charging state from a beginning nominal charging state value for the real-time driving speed variable value at a beginning of the braking and an end nominal charging state value for an end driving speed variable value at an end of the braking;
      determining a difference value for the actual charging state from a beginning actual charging state value at the beginning of braking and an end actual charging state value of the energy accumulator at the end of braking;
      comparing the difference value for the nominal charging state with the difference value for the actual charging state;
      establishing the correction value for lowering the characteristic curve for a subsequent braking under the same braking conditions in such a way that the new nominal charging state value is smaller than the first nominal charging state value, if the difference value for the actual charging state is larger than the difference value for the nominal charging state, or
      establishing the correction value for raising the characteristic curve for a subsequent braking under the same braking conditions in such a way that the new nominal charging state value is larger than the first nominal charging state value, if the difference value for the actual charging state is smaller than the difference value for the nominal charging state.

2. The method according to claim 1, wherein the hybrid drive has an electric motor that is switched on as the energy consumer.

3. The method according to claim 1,
   wherein by establishing the correction value for lowering the characteristic curve, the first nominal charging state value of the characteristic curve that is associated with a higher driving speed variable value than the real-time driving speed variable value is reduced to the new nominal charging state value, if the first nominal charging state value associated with the higher driving speed variable value is larger than the new nominal charging state value; and
   by establishing the correction value for raising the characteristic curve, the first nominal charging state value of the characteristic curve that is associated with a lower driving speed variable value than the real-time driving speed variable value is increased to the new nominal charging state value, if the first nominal charging state value associated with the lower driving speed variable value is smaller than the new nominal charging state value.

4. The method according to claim 1, wherein the correction value has an absolute value that is determined by multiplying a difference between the difference value for the nominal charging state and the difference value for the actual charging state by a learning factor.

5. The method according to claim 4, wherein the learning factor has a value in the case of establishing the correction value for lowering the characteristic curve that is larger than in the case of establishing the correction value for raising the characteristic curve.

6. A control unit for regulating a charging state of an energy accumulator for a vehicle with a hybrid drive, the control unit comprising a charging state regulator and an information memory,
   wherein the control unit determine a nominal charging state of the energy accumulator as a function of a driving speed variable value of the vehicle that can be detected by a driving speed detection device and compares an actual charging state of the energy accumulator that can be detected by a charging state detection device with the nominal charging state, wherein the charging state regulator switches on an energy consumer for at least partially discharging the energy accumulator when the actual charging state exceeds the nominal charging state, wherein a characteristic curve is stored in the information memory, which curve tabulates nominal charging state values as a function of driving speed variable values, wherein the control unit determines the nominal charging state of the energy accumulator by determining a first nominal charging state value of the characteristic curve and adapts the characteristic curve when the vehicle is braked by determining a correction value that is added to the first nominal charging state value of the characteristic curve, wherein the first nominal charging state value is associated with a real-time driving speed variable value during braking, and wherein the first nominal charging state value that is increased or decreased by adding the correction value is stored as a new nominal charging state value of the characteristic curve for the real-time driving speed variable value, wherein the correction value is determined by:
  determining a difference value for the nominal charging state from a beginning nominal charging state value for the real-time driving speed variable value at a beginning of the braking and an end nominal charging state value for an end driving speed variable value at an end of the braking;
  determining a difference value for the actual charging state from a beginning actual charging state value at the beginning of braking and an end actual charging state value of the energy accumulator at the end of braking;
  comparing the difference value for the nominal charging state with the difference value for the actual charging state;
  establishing the correction value for lowering the characteristic curve for a subsequent braking under the same braking conditions in such a way that the new nominal charging state value is smaller than the first nominal charging state value, if the difference value for the actual charging state is larger than the difference value for the nominal charging state, or
  establishing the correction value for raising the characteristic curve for a subsequent braking under the same braking conditions in such a way that the new nominal charging state value is larger than the first nominal charging state value, if the difference value for the actual charging state is smaller than the difference value for the nominal charging state.

7. The control unit according to claim 6, wherein the energy consumer switched on by the charging state regulator is an electric motor.

8. A vehicle comprising:
a hybrid drive;
an energy accumulator;
a driving speed detection device for detecting a driving speed variable value of the vehicle;
a charging state detection device for detecting an actual charging state of energy accumulator; and
a control unit determining a nominal charging state of the energy accumulator as a function of the driving speed variable value of the vehicle detected by the driving speed detection device and comparing the actual charging state of the enemy accumulator detected by the charging state detection device with the nominal charging state, the control unit having a charging state regulator, the charging state regulator switching on an energy consumer for at least partially discharging the energy accumulator when the actual charging state exceeds the nominal charging state, the control unit comprising an information memory, whereby a characteristic curve is stored in the information memory, which curve tabulates nominal charging state values as a function of driving speed variable values, the control unit determining the nominal charging state of the energy accumulator by determining a first nominal charging state value of the characteristic curve, the control unit adapting the characteristic curve when the vehicle is braked by determining a correction value that is added to the first nominal charging state value of the characteristic curve, said correction value being associated with a real-time driving speed variable value during braking, and the first nominal charging state value which is increased or decreased by adding the correction value is stored as a new nominal charging state value of the characteristic curve for the real-time driving speed variable value.

wherein the correction value is determined by:
  determining a difference value for the nominal charging state from a beginning nominal charging state value for the real-time driving speed variable value at a beginning of the braking and an end nominal charging state value for an end driving speed variable value at an end of the braking;
  determining a difference value for the actual charging state from a beginning actual charging state value at the beginning of braking and an end actual charging state value of the energy accumulator at the end of braking;
  comparing the difference value for the nominal charging state with the difference value for the actual charging state;
  establishing the correction value for lowering the characteristic curve for a subsequent braking under the same braking conditions in such a way that the new nominal charging state value is smaller than the first nominal charging state value, if the difference value for the actual charging state is larger than the difference value for the nominal charging state, or
  establishing the correction value for raising the characteristic curve for a subsequent braking under the same braking conditions in such a way that the new nominal charging state value is larger than the first nominal charging state value, if the difference value for the actual charging state is smaller than the difference value for the nominal charging state.

9. The vehicle according to claim 8, wherein the energy accumulator has a maximum capacity to take up a maximum braking energy of the vehicle at a maximum vehicle speed.

10. The vehicle according to claim 8, wherein the energy accumulator is a multi-layer capacitor.

11. The method according to claim 4, wherein the learning factor is selected smaller than one.

12. The vehicle according to claim 8, wherein the energy accumulator is a double-layer capacitor.

* * * * *